United States Patent [19]

Beauch

[11] Patent Number: 4,903,540
[45] Date of Patent: Feb. 27, 1990

[54] STEERING WHEEL TILT-LOCK

[75] Inventor: Howard D. Beauch, Frankenmuth, Mich.

[73] Assignee: General Motors Corporation, Detroit, Mich.

[21] Appl. No.: 332,269

[22] Filed: Apr. 3, 1989

[51] Int. Cl.[4] ............................................... B62D 1/18
[52] U.S. Cl. .................................... 74/493; 74/89.14; 74/398; 280/775
[58] Field of Search ....................... 74/493, 89.14, 398; 280/775

[56] References Cited

U.S. PATENT DOCUMENTS

| | | | |
|---|---|---|---|
| 2,348,391 | 5/1944 | Kester | 74/398 X |
| 2,464,856 | 3/1949 | Finley | 74/493 |
| 2,748,617 | 6/1956 | Deibel | 74/398 X |
| 3,258,987 | 7/1966 | Zeigler et al. | 74/493 |
| 3,851,543 | 12/1974 | Krom | 74/493 |
| 4,335,625 | 6/1982 | Nishikawa | 74/493 |
| 4,422,346 | 12/1983 | Nishikawa | 74/493 |
| 4,593,577 | 6/1986 | Kinoshita | 74/493 |
| 4,598,604 | 7/1986 | Sorsche et al. | 74/493 |

*Primary Examiner*—Allan D. Herrmann
*Attorney, Agent, or Firm*—Saul Schwartz

[57] ABSTRACT

A tilt-lock for a tilt-adjustable steering wheel has angular gross and angular fine adjustment capability. A worm gear sector on a housing pivotable with the steering wheel meshes with a worm wheel on a latch plate pivotable on a stationary bracket. When the latch plate is in a latching position the worm wheel meshes with the worm gear sector to capture the angular gross adjusted position of the steering wheel. The worm wheel is rotatable for angular fine adjustment of the steering wheel. When the latch plate is moved to the releasing position, the worm wheel separates from the worm gear sector to release the steering wheel for angular gross adjustment.

3 Claims, 1 Drawing Sheet

1

STEERING WHEEL TILT-LOCK

FIELD OF THE INVENTION

This invention relates to adjustment mechanisms or tilt-locks for tilt-adjustable steering wheels on automotive steering columns.

BACKGROUND OF THE INVENTION

Tilt-locks for tilt-adjustable steering wheels commonly include a gear sector pivotable as a unit with the tilt-adjustable steering wheel and a toothed latch plate pivotally supported on a stationary part of the steering column. The latch plate releasably captures adjusted positions of the steering wheel through meshing engagement of teeth on the plate and teeth on the gear sector. When the latch plate is pivoted, the teeth separate and the gear sector and steering wheel are pivotable in the usual manner. The minimum angular interval between adjusted positions of the steering wheel equals the minimum angular interval between the meshing teeth on the gear sector and on the latch plate. In a prior proposal for reducing the minimum angular interval, a relatively complex lever system changes the angular movement relationship between the gear sector and the steering wheel. In other prior proposals, infinite angular adjustment of the steering wheel is achieved through a threaded rod carried on a lever pivotally supported on the pivotable housing carrying the steering wheel. In those systems, the steering wheel can be released for pivotal movement to an upper limit position but can be adjusted between operational positions only through manual turning of the threaded rod because the steering wheel always returns to its previously adjusted position after a release cycle. An adjustment mechanism or tilt-lock according to this invention provides both angular gross and angular fine adjustment for a tilt-adjustable steering wheel.

SUMMARY OF THE INVENTION

This invention is a new and improved tilt-lock for a tilt-adjustable steering wheel on a automotive steering column. The new and improved tilt-lock according to this invention includes a worm gear seotoz on a bearing housing pivotable as a unit with the tilt-adjustable steering wheel, a latch plate pivotally supported on a stationary part of the steering column, a spirally threaded worm wheel rotatably supported on the latch plate and movable with the latter into and out of mesh with the worm gear sector, and a release lever pivotally supported on a stationary part of the steering column and extending through slots in the latch plate and in a stationary bracket on the steering column. The latch plate is spring biased such that the spiral thread on the worm wheel is normally held meshed with the worm gear sector. Gross adjustment of the steering wheel is effected by pulling the release lever to separate the worm wheel thread from the worm gear sector. Fine adjustment is effected by rotating the worm wheel without pulling the release lever.

DESCRIPTION OF A PREFERRED EMBODIMENT

Figure 1:
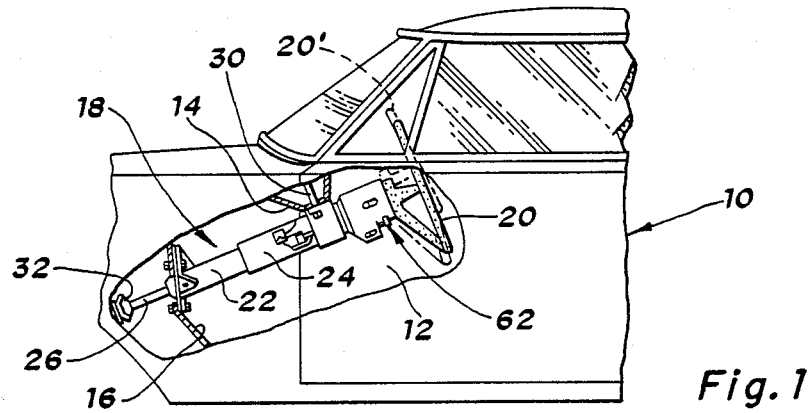
FIG. 1 is a fragmentary, broken-away elevational view of an automobile having a steering column according to his invention thereon.

Referring to FIG. 1, an automobile 10 has a passenger compartment 12, an instrument panel support 14, and a forward wall 16 defining the front extremity of the passenger compartment. A steering column 18 having a tilt-adjustable steering wheel 20 thereon is disposed in the passenger compartment 12 in convention fashion.

Figure 2:
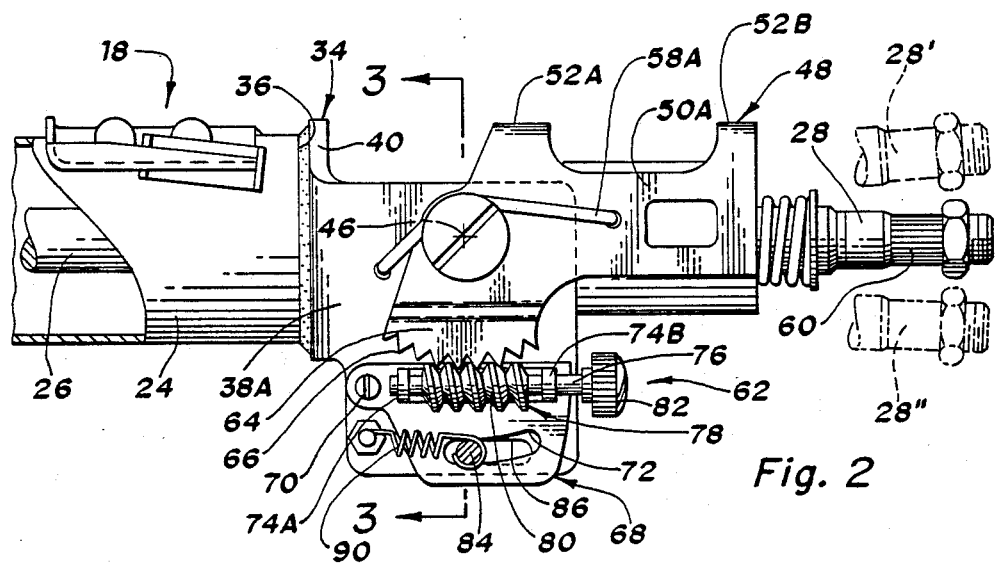
FIG. 2 is an enlarged view of a portion of FIG. 1.

The steering column 18 includes a tubular lower mast jacket 22, a tubular upper mast jacket 24, a lower steering shaft 26, and an upper steering shaft 28, FIG. 2. The bottom end of the lower mast jacket 22 is anchored to the forward wall 16 and the top end, not shown, is telescoped inside the bottom end of the upper mast jacket 24. A roll deformer energy absorber, not shown, is disposed in the annulus defined at the overlap between the upper and lower mast jackets. The energy absorber is activated when the upper mast jacket telescopes down over the lower mast jacket in known fashion. The upper mast jacket is releasably attached to the instrument panel support 14 by threaded rods on the panel support, only a single rod 30 being shown in FIG. 1.

The lower steering shaft 26 is supported by bearings, not shown, within the lower mast jacket for rotation about a longitudinal axis of the steering column. The lower steering shaft projects from the bottom of the lower mast jacket 22 and is connected to a steering gear, not shown, of the automobile at a joint 32 ahead of the forward wall 16.

A U-shaped bracket 34 is rigidly attached to the upper mast jacket 24 at a top end 36 thereof, FIG. 2 The bracket has a pair of generally planar side members 38A-B and a base 40 between the side members. The base 40 is disposed across the top end of the upper mast jacket 24 and includes a window 42, FIG. 3, for passage of the lower steering shaft 26. The planar side members 38A-B have respective ones of a pair of threaded holes 44A-B therein aligned on a stationary transverse axis 46.

A bearing carrier or housing 48 of generally inverted U-shape form straddles the side members 38A-B of the bracket 34. The housing 48 has a pair of sides 50A-B, FIGS. 2 and 3, disposed laterally outboard of and parallel to the side members 38A-B, respectively, of the bracket 34 and a pair of transverse webs 52A-B between the sides. The sides 50A-B have respective ones of a pair of bearing holes 54A-B therein, FIG. 3, which register with the threaded holes 44A-B in the bracket 34. A pair of pivot pins 56A-B in the bearing holes 54A-B are threaded into the holes 44A-B and support te housing 48 on the bracket 34 for up and down pivotal movement about the axis 46. Mechanical stops, not shown, between the housing and the bracket define the limits of pivotal movement of the housing 48.

The upper steering shaft 28 is supported on the housing 48 for up and down pivotal movement as a unit therewith about the axis 46 and for rotation relative thereto. The lower steering shaft 26 is connected to the upper steering shaft 28 for unitary rotation through an articulated joint, not shown, between the side members 38A-B centered on the axis 46. A representative articulated joint is described in U.S. Pat. No. 3258987, issued July 5, 1966 to Zeigler et al and assigned to the assignee of this invention. The upper steering shaft 28 has an upper limit position 28, and a lower limit position 28", FIG. 2, corresponding to the highest and lowest stop-limited positions of the housing 48. A pair of torsion springs 58A-B on the pins 56A-B bias the housing toward its highest stop-limited position. The steering wheel 20 is rigidly fitted over a serrated top end 60 of the upper steering shaft. A tilt-lock 62 according to this is disposed between the housing 48 and the bracket 34.

The tilt-lock 62 includes a laterally off-set lip 64 on the side 50A of the housing 48. The lip has an arc-shaped lower margin on which are formed a plurality of worm gear teeth whereby the lower margin defines a worm gear sector 66, FIGS. 2 and 3, center about axis 46. The worm gear sector 66 pivots as a unit with the housing 48 about axis 46.

A latch plate 68 of the tilt-lock 62 is supported on a pin 70 on the side member 38A for pivotal movement in a plane parallel to the side member between a latching position, FIG. 2, and a releasing position, not shown, displaced clockwise from the latching position. The latch plate 68 has an arc-shaped cam slot 72 therein and a pair of integral lugs 74A-B perpendicular to the plane of the latch plate. A manual adjustment shaft 76 is rotatably supported on the lugs 74A-B in a fashion preventing movement of the shaft in its lengthwise direction. A worm wheel 78 is rigidly attached to the manual adjustment shaft 76 between the lugs 74A-B and rotates as a unit with the shaft. The worm wheel has a spiral thread 80 which meshes with the worm gear sector 66 in the latching position of the latch plate 68. The adjustment shaft 76 has a knob 82 at its distal end nearest the steering wheel 20.

Figure 3:
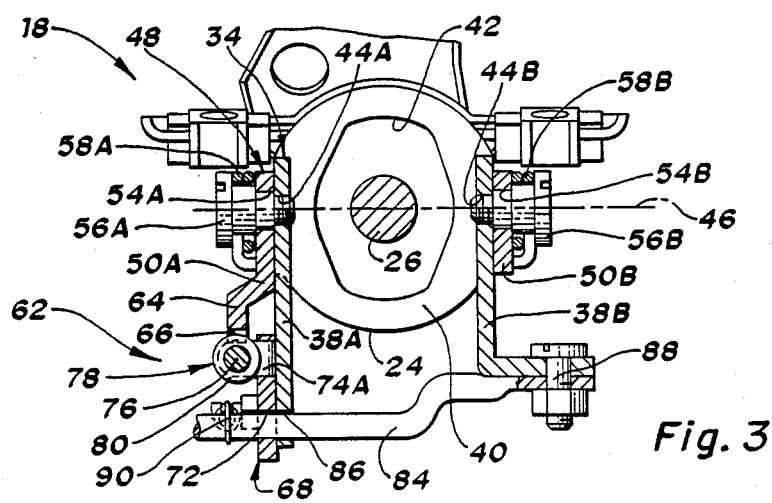
FIG. 3 is a sectional view taken generally along the plane indicated by lines 3—3 in FIG. 2.

The tilt-lock 62 further includes a release lever 84 which extends through the cam slot 72 and a flat control slot 86, FIGS. 2 and 3, in the side member 38A. The release lever 84 is attached to the side member 38B through a pin 88 for movement between a retracted position, FIG. 2, near the left end of the control slot 86 and an extended position, not shown, near the right end of the control slot. A spring 90 biases the release lever to the retracted position which corresponds to the latched position of the latch plate 68. When the release lever is manually pulled to the extended position, the shape of the cam slot 72 in the latch plate 68 causes the latter to pivot from the latching position to the releasing position.

The tilt-lock 62 operates as follows. A driver seated in the passenger compartment behind the steering wheel 20 and preparing to exit the vehicle grasps the release lever 84 and pulls it against spring 90 from its retracted position to its extended position. The release lever pivots the latch plate to the releasing position, not shown, in which position the spiral thread 80 on the worm wheel 78 is disengaged or remote from the worm gear sector 66 so that the housing 48 is free to pivot about the axis 46. The steering wheel is lifted with the assistance of springs 58A-B to an uppermost position 20', FIG. 1, corresponding to the upper limit position 28, of the upper steering shaft 28, FIG. 2, and the vehicle is exited.

Upon reentry, the driver effects angular gross adjustment of the steering wheel by pulling the release lever to its extended position and lowering the steering wheel to an approximately comfortable position. The approximately comfortable position is captured by returning the release lever to its retracted position with the spiral thread 80 meshing with the worm gear sector 66.

Fine adjustment of the steering wheel is effected by manual rotation of the knob 82 on the shaft 76. As the shaft 76 rotates, the spiral thread 80 on the worm wheel 78 meshing with the worm gear sector 66 causes the sector and the housing 48 to pivot relative to the upper mast jacket 24 until a comfortable position of the steering wheel 20 is achieved. Because the worm gear sector can not back-drive the worm wheel 78, the driver can not change the position of the steering wheel 20 by pushing down or pulling up on the wheel.

The embodiments of the invention in which an exclusive property or privilege is claimed are defined as follows:

1. A tilt-lock for a tilt-adjustable steering wheel on an upper end of a steering column mast jacket comprising:
   means defining a worm gear sector,
   means mounting said worm gear sector on said steering column mast jacket for pivotal movement as a unit with said steering wheel about a first transverse axis of said mast jacket,
   a latch plate mounted on said mast jacket for pivotal movement about a second transverse axis of said mast jacket between a matching position and a releasing position,
   spring means between said mast jacket and said latch plate biasing said latch plate to said latching position,
   manual lever means on said mast jacket operative to move said latch plate from said latching to said releasing position,
   a worm wheel having a spiral worm thread thereon for mesh with said worm gear sector, means mounting said worm wheel on said latch plate for pivotal movement as a unit therewith and for rotation relative thereto,
   said worm wheel spiral thread meshing with said worm gear sector in said latching position of said latch plate to capture an angular gross adjusted position of said steering wheel relative to said mast jacket and being remote from said worm gear sector in said releasing position of said latch plate to permit said angular gross adjustment of said steering wheel, and
   manual actuation means connected to said worm wheel for rotating said worm wheel in said latching position of said latch plate to effect angular fine adjustment of said steering wheel relative to said mast jacket in said latching position of said latch plate.

2. The tilt-lock recited in claim 1 wherein said manual actuation means connected to said worm wheel includes a shaft rotatable as a unit with said worm wheel, and a hand grip knob on a distal end of said shaft.

3. The tilt-lock recited in claim 2 wherein said manual lever means on said mast jacket operative to move said latch plate from said latching position to said releasing position includes,
   means defining a cam slot in said latch plate,
   means defining a control slot in a stationary bracket on said mast jacket adjacent said latch plate,
   a release lever extending through said cam slot and through said control slot with a distal end thereof accessible for manual actuation,
   means mounting said release lever on said mast jacket for pivotal movement between a retracted position in said latching position of said latch plate and an extended position in said releasing position of said latch plate, and
   spring means biasing said release lever to said retracted position.

* * * * *